(12) United States Patent
Ghosh et al.

(10) Patent No.: US 10,404,459 B2
(45) Date of Patent: Sep. 3, 2019

(54) TECHNOLOGIES FOR ELLIPTIC CURVE CRYPTOGRAPHY HARDWARE ACCELERATION

(71) Applicant: Intel Corporation, Santa Clara, CA (US)

(72) Inventors: Santosh Ghosh, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 15/428,773

(22) Filed: Feb. 9, 2017

(65) Prior Publication Data

US 2018/0227115 A1 Aug. 9, 2018

(51) Int. Cl.
*H04L 9/30* (2006.01)
*H04L 9/00* (2006.01)
*H04K 1/00* (2006.01)

(52) U.S. Cl.
CPC ............ *H04L 9/3066* (2013.01); *H04L 9/002* (2013.01); *H04L 2209/12* (2013.01)

(58) Field of Classification Search
CPC .... H04L 9/3066; H04L 9/002; H04L 2209/12
USPC .......................................................... 380/30
See application file for complete search history.

(56) References Cited

U.S. PATENT DOCUMENTS

| | | | | |
|---|---|---|---|---|
| 7,200,225 B1 * | 4/2007 | Schroeppel | ............. | G06F 7/725 380/277 |
| 8,345,864 B1 * | 1/2013 | Robinson | ................ | G06F 7/725 380/28 |
| 9,716,584 B2 * | 7/2017 | Dubeuf | .................... | G06F 21/72 |
| 2004/0015613 A1 * | 1/2004 | Ikeda | .................. | G06F 15/7867 710/1 |
| 2005/0226407 A1 * | 10/2005 | Kasuya | .................... | G09C 1/00 380/28 |
| 2007/0263596 A1 * | 11/2007 | Charrat | ................... | H04L 45/00 370/351 |

(Continued)

OTHER PUBLICATIONS

Y.Shekar; Cryptographic Algorithms Implementation on RISC Processor; International Journal of Inventive Engineering and Sciences (IJIES) ISSN: 2319-9598, vol.-1, Issue-12, Nov. 2013; p. 4-6 (Year: 2013).*

(Continued)

*Primary Examiner* — Monjur Rahim
(74) *Attorney, Agent, or Firm* — Barnes & Thornburg LLP (57) ABSTRACT

Technologies for elliptic curve cryptography (ECC) include a computing device having an ECC engine that reads a datapath selector signal that indicates a 256-bit data width or a 384-bit data width. The ECC engine reads one or more parameters having a data width indicated by the datapath selector signal from a data port. The ECC engine reads an opcode from an instruction port that identifies an ECC operation such as an elliptic curve operation or a prime field arithmetic operation. The ECC engine performs the operation with the data width identified by the datapath selector. The ECC engine writes results data having the data width identified by the datapath selector to one or more output ports. The ECC engine may perform the elliptic curve operation with a specified side-channel protection level. The computing device may include a cryptography driver to control the ECC engine. Other embodiments are described and claimed.

25 Claims, 5 Drawing Sheets

(56) References Cited

U.S. PATENT DOCUMENTS

| | | | |
|---|---|---|---|
| 2008/0130873 A1* | 6/2008 | Bolotov | H04L 9/3066 380/28 |
| 2011/0154501 A1* | 6/2011 | Banginwar | H04L 9/3236 726/26 |
| 2016/0105281 A1* | 4/2016 | Fischer | G09C 1/00 380/28 |
| 2016/0277178 A1* | 9/2016 | Dubeuf | H04L 9/002 |
| 2018/0103018 A1* | 4/2018 | Chauhan | H04L 63/0471 |

OTHER PUBLICATIONS

U.S. Appl. No. 15/637,737, filed Jun. 29, 2017, entitled "Technologies for Robust Computation of Elliptic Curve Digital Signatures" by Santosh Ghosh and Manoj Sastry.

IEEE Std 1609.2-2016 ("IEEE Standard for Wireless Access in Vehicular Environments—Security Services for Applications and Management Messages"), approved Jan. 29, 2016.

"Elliptic Curve Digital Signature Algorithm," retrieved from https://en.wikipedia.org/wiki/Elliptic_Curve_Digital_Signature_Algorithm on Jun. 29, 2017.

"Elliptic curve point multiplication," retrieved from https://en.wikipedia.org/wiki/Elliptic_curve_point_multiplication on Jun. 29, 2017.

FIPS PUB 140-2, "Security Requirements for Cryptographic Modules," dated May 25, 2001.

* cited by examiner

TECHNOLOGIES FOR ELLIPTIC CURVE CRYPTOGRAPHY HARDWARE ACCELERATION

BACKGROUND

As computing devices and electronic communication networks continue to proliferate in a variety of forms, information security remains an important concern. Cryptographic techniques are often used to ensure that electronic information is safely delivered to its intended recipient, and to determine whether devices and/or processes requesting access to information or other devices should be granted such access. Public key cryptography is a technique that typically uses two keys: a private key, which remains secret; and a public key, which may be freely disclosed, to define membership in a group of trusted computing devices. While the public key and the private key are related, the private key cannot feasibly be determined from the public key.

Elliptic curve cryptography (ECC) is a class of public key cryptography based on cryptographic operations using elliptic curves over finite fields. ECC operations may be used to perform traditional cryptographic operations including key exchange and digital signature operations. For example, common cryptographic algorithms using ECC operations include elliptic curve Diffie-Hellman (ECDH) for key exchange, the elliptic curve digital signature algorithm (ECDSA) for digital signature sign/verify operations, enhanced privacy ID (EPID) for attestation, and other cryptographic algorithms.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
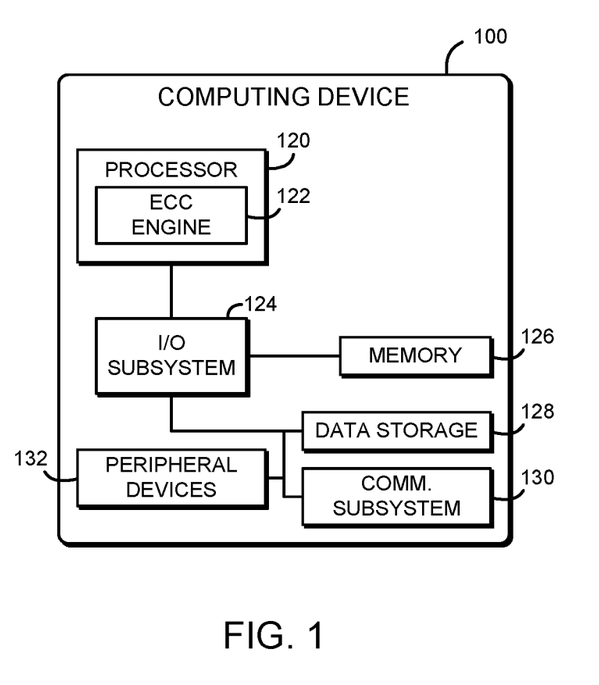
FIG. 1 is a simplified block diagram of at least one embodiment of a computing device for elliptic curve cryptography (ECC) hardware acceleration.

Referring now to FIG. 1, in an illustrative embodiment, a computing device 100 for elliptic curve cryptography (ECC) hardware acceleration includes a processor 120 and an ECC engine 122. As described below, software and/or firmware executed by the processor 120 may offload elliptic curve cryptographic operations to the ECC engine 122. The processor 120 sets a datapath select line of the ECC engine 122 to specify whether a cryptographic operation is to be performed on 256-bit data or 384-bit data. The processor 120 loads one or more registers of the ECC engine 122 with appropriate parameters and/or operands, instructs the ECC engine 122 to perform a cryptographic operation, and then reads results data from the ECC engine 122. The processor 120 may also specify a particular side-channel attack protection level to be used by the ECC engine 122. The ECC engine 122 may provide fast, power-efficient computation of ECC cryptographic operations, with improved performance and/or power consumption compared to performing the same operation using a general-purpose processor core. For example, one potential embodiment of the ECC engine 122 has been implemented in about 65,000 logic gates and was simulated to be about 30 times faster than equivalent software solutions. Additionally, by supporting 384-bit data and associated ECC operations (i.e., ECC-384), the ECC engine 122 may support 192-bit security strength. By providing low power consumption and a relatively high level of security strength, the ECC engine 122 may be appropriate for Internet-of-Things devices or other low-power devices with long deployment cycles (e.g., 15-20 years).

The computing device 100 may be embodied as any type of computation or computer device capable of performing the functions described herein, including, without limitation, a computer, a mobile computing device, an Internet-of-Things device, a network appliance, a web appliance, a wearable computing device, a laptop computer, a notebook computer, a tablet computer, a desktop computer, a workstation, a server, a distributed computing system, a processor-based system, and/or a consumer electronic device. As shown in FIG. 1, the computing device 100 illustratively include a processor 120, an input/output subsystem 124, a memory 126, a data storage device 128, and a communication subsystem 130, and/or other components and devices commonly found in an Internet-of-Things device or similar computing device. Of course, the computing device 100 may include other or additional components, such as those commonly found in a mobile computing device (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes the ECC engine 122. The ECC engine 122 may be embodied as any functional block, IP core, embedded controller, logic circuit, logic gates, and/or other component of the processor 120 capable of performing the functions described herein. Additionally, although illustrated as being included in the processor 120, it should be understood that in some embodiments the ECC engine 122 may be included in a different component of the computing device 100 such as the I/O subsystem 124 or may be embodied as a standalone accelerator, coprocessor, security engine, or other integrated circuit.

The memory 126 may be embodied as any type of volatile or non-volatile memory or data storage capable of performing the functions described herein. In operation, the memory 126 may store various data and software used during operation of the computing device 100, such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the computing device 100 may be embodied as any communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, InfiniBand®, Bluetooth®, Wi-Fi®, WiMAX, ZigBee®, Z-Wave®, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
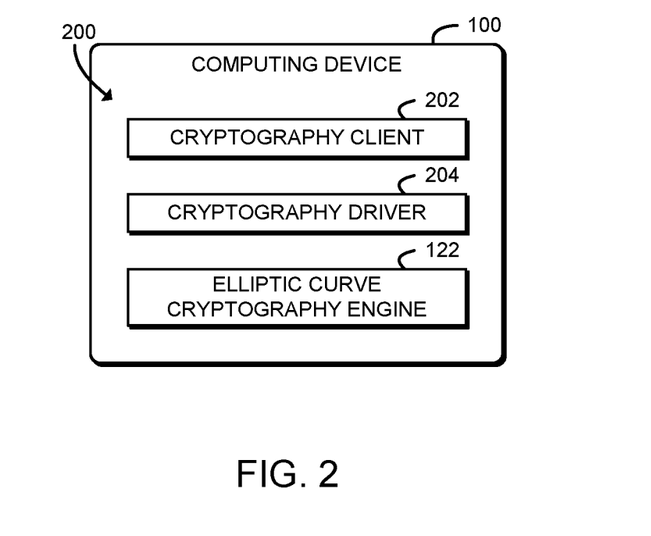
FIG. 2 is a simplified block diagram of at least one embodiment of an environment that may be established by a computing device of FIG. 1.

Referring now to FIG. 2, in an illustrative embodiment, the computing device 100 establishes an environment 200 during operation. The illustrative environment 200 includes a cryptography client 202, a cryptography driver 204, and the ECC engine 122. The various components of the environment 200 may be embodied as hardware, firmware, software, or a combination thereof. As such, in some embodiments, one or more of the components of the environment 200 may be embodied as circuitry or collection of electrical devices (e.g., cryptography client circuitry 202, cryptography driver circuitry 204, and/or ECC engine circuitry 122). It should be appreciated that, in such embodiments, one or more of the cryptography client circuitry 202, the cryptography driver circuitry 204, and/or the ECC engine circuitry 122 may form a portion of one or more of the processor 120, the I/O subsystem 124, and/or other components of the computing device 100. Additionally, in some embodiments, one or more of the illustrative components may form a portion of another component and/or one or more of the illustrative components may be independent of one another.

The cryptography client 202 may be embodied as any operating system, library, application, or other computer program executed by the computing device 100 that performs cryptographic procedures using elliptic curve cryptography (ECC). For example, the cryptography client 202 may be embodied as a library or application that performs a cryptographic protocol that includes ECC operations, such as ECDSA, ECDH, EPID, or other protocol. To perform the cryptographic procedures, the cryptography client 202 invokes the cryptography driver 204 to perform one or more cryptographic operations, such elliptic curve scalar multiplication, elliptic curve point addition, elliptic curve point doubling, prime field exponentiation, prime field multiplication, prime field addition, and/or prime field subtraction. As described further below, the cryptography driver 204 is configured to program the ECC engine 122 to perform the requested cryptographic operations.

The ECC engine 122 is configured to read a datapath selector signal of the ECC engine 122. The datapath selector signal indicates a 256-bit data width or a 384-bit data width. The ECC engine 122 is further configured to read one or more parameter values corresponding to parameters of the requested cryptographic operation from a data port of the ECC engine 122. Each parameter has a data width indicated by the datapath selector signal. The ECC engine 122 is further configured to read an opcode indicative of the requested cryptographic operation from an instruction port of the ECC engine 122 and to perform the requested cryptographic operation. The cryptographic operation also has a data width indicated by the datapath selector signal. In some embodiments, the opcode may be indicative of a register of the ECC engine 122, and the ECC engine 122 may store the parameter value in the identified register. The ECC engine 122 is further configured to write results data to an output port of the ECC engine 122 in response to performing the cryptographic operation. The results data also has a data width indicated by the datapath selector signal.

The cryptography driver 204 is configured to determine whether a busy signal of the ECC engine 122 is set and then set the datapath selector signal of the ECC engine 122 in response to determining that the busy signal is not set. The cryptography driver 204 is further configured to assert a start signal of the ECC engine 122 in response to setting the datapath selector signal. The cryptography driver 204 is further configured to write the opcode to the instruction port of the ECC engine 122 in response to asserting the start signal and to assert an instruction valid signal of the ECC engine 122 in response to writing the opcode.

The ECC engine 122 is further configured determine whether the start signal is asserted and set the busy signal in response to determining that the start signal is asserted. The ECC engine 122 is further configured to determine whether the instruction valid signal is asserted in response to determining that the start signal is asserted and to read the opcode in response to determining that the instruction valid signal is asserted. The ECC engine 122 is further configured to clear the busy signal in response to performing the cryptographic operation and to assert an operation done signal of the ECC engine 122 in response to clearing the busy signal. The cryptography driver 204 is further configured to determine whether the operation done signal of the ECC engine 122 is asserted and to read results data from the output port of the ECC engine 122 in response to determining that the operation done signal of the ECC engine 122 is asserted.

Figure 3:
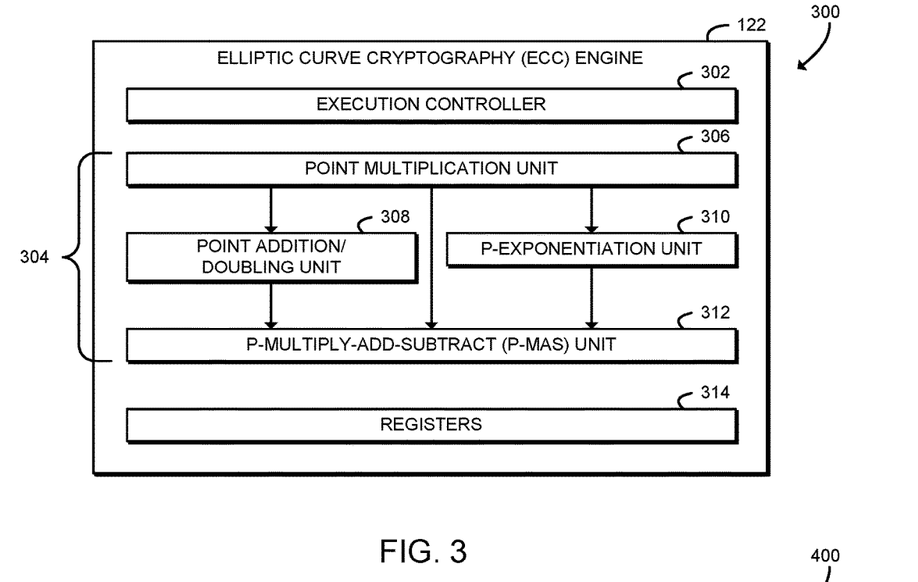
FIG. 3 is a simplified block diagram of at least one embodiment of the ECC engine of FIGS. 1-2.

Referring now to FIG. 3, diagram 300 illustrates one potential embodiment of various components of the ECC engine 122. As shown, the ECC engine 122 may include an execution controller 302, multiple execution resources 304, and registers 314. The execution resources 304 illustratively include a point multiplication unit 306, a point addition/doubling unit 308, a p-exponentiation unit 310, and a p-multiply-add-subtract (p-MAS) unit 312. Each of the execution resources 304 may load data from and store data to the registers 314. Additionally, data may be transferred directly between certain execution resources 304. In particular, the point multiplication unit 306 may provide data to the point addition/doubling unit 308, the p-exponentiation unit 310, and the p-MAS unit 312; the point addition/doubling unit 308 may provide data to the p-MAS unit 312, and the p-exponentiation unit 310 may provide data to the p-MAS unit 312.

The execution controller 302 is configured to decode instructions provided to the ECC engine 122 and generate corresponding internal control signals. As described further below, the execution controller 302 may also convert input data from affine coordinates (i.e., x and y coordinates) to Jacobian projective coordinates for certain operations. The execution controller 302 activates corresponding execution resources 304 to execute the current instruction. After execution, the execution controller 302 may convert the Jacobian projective coordinates back to affine coordinates. The execution controller 302 is configured to output results data on one or more data out ports and to signal to the cryptography driver 204 that results are ready.

The point multiplication unit 306 is configured to compute the scalar multiplication operation [d]P, where d is a scalar value and P is a point on the elliptic curve. The point multiplication unit 306 may perform the scalar multiplication operation using a binary left-2-right double-and-add procedure if a parameter $\lambda$ is zero or a Montgomery Ladder procedure if the parameter $\lambda$ is non-zero.

The point addition/doubling unit 308 is configured to execute the point addition operation A+B and the point doubling operation 2A, where A and B are both points on the elliptic curve. The point addition/doubling unit 308 may perform the A+B and 2A operations based on a standard Jacobian projective coordinate point addition formula. In some embodiments, the point addition/doubling unit 308 may provide speedups for the 2A operation for certain elliptic curves by performing different operations based on the value of a curve parameter a. For example, if a is zero, then the point addition/doubling unit 308 may perform the 2A operation with six prime field multiplication operations, if a is three then the point addition/doubling unit 308 may perform the 2A operation with eight prime field multiplication operations, and if a is not zero and not three, the point addition/doubling unit 308 may perform the 2A operation with 10 prime field multiplication operations.

The p-exponentiation unit 310 is configured to compute prime field exponentiation $a^b$ (mod p) with timing and simple power/electromagnetic radiation protection. Similarly, the p-MAS unit 312 is configured to compute prime field multiplication a·b (mod p), prime field addition a+b (mod p), and prime field subtraction a−b (mod p) with timing and simple power/electromagnetic radiation protection.

Figure 4:
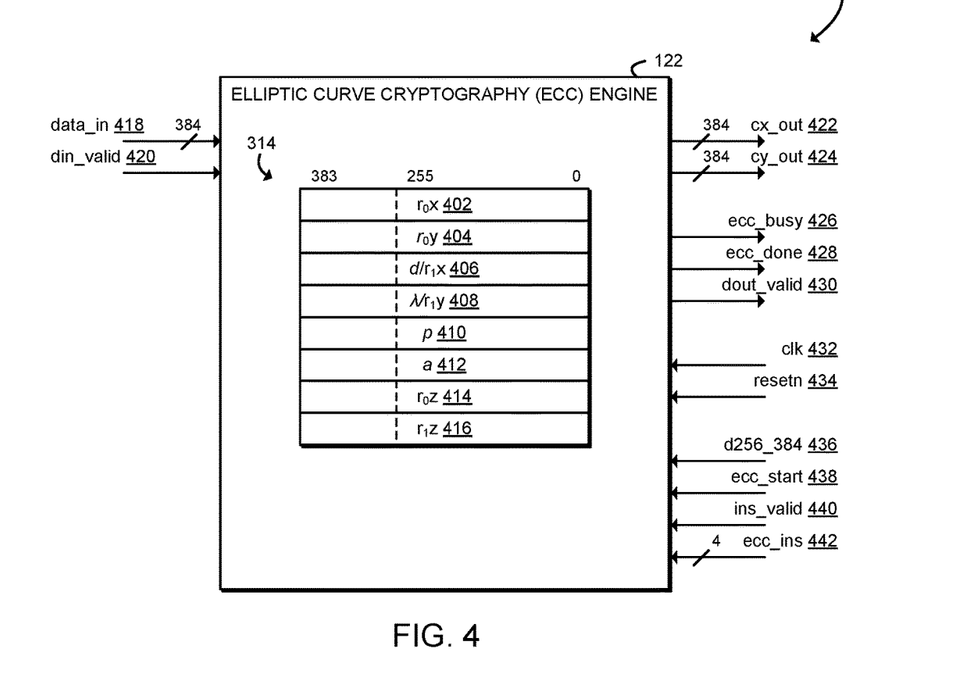
FIG. 4 is a simplified pinout diagram of at least one embodiment of the ECC engine of FIGS. 1-3.

Referring now to FIG. 4, diagram 400 illustrates one potential embodiment of the registers 314 and various input/output signals, lines, pins, buses, or other interface connections provided by the ECC engine 122. As described further below, software and/or firmware executed by the processor 120 may control the ECC engine 122 by reading and writing data and/or control signals of the ECC engine 122.

As shown, the illustrative ECC engine 122 includes eight registers 314. Each of the registers 314 is 384 bits wide. As described further below, the ECC engine 122 may be programmed to use all 384 bits of each register 314 for 384-bit operations or may be programmed to use the least significant 256 bits of each register 314 for 256-bit operations. Each of the registers 314 may store parameter data provided by the processor 120 as well as intermediate data and results data generated by the ECC engine 122. As shown in FIG. 4, the registers 314 include an $r_0x$ register 402, an $r_0y$ register 404, a $d/r_1x$ register 406, a $\lambda/r_1y$ register 408, a p register 410, an a register 412, an $r_0z$ register 414, and an $r_1z$ register 416. The semantics of each register 314 may depend on the particular cryptographic operation executed by the ECC engine 122 and are further described below. Of course, in addition to the top-level registers 314 shown in FIG. 4, in some embodiments the ECC engine 122 may include additional registers that are not shown.

The ECC engine 122 includes a data in port 418 and a data in valid signal 420. The data in port may include 384 separate signals, lines, bits, pins, or other interface connections. As described further below, the processor 120 may write parameter data to the data in port 418 that is to be stored in one of the registers 314. The processor 120 may set the data in valid signal 420 to indicate that valid data is on the data in port 418.

The ECC engine 122 includes a data out port 422 and a data out port 424. Each of the data out ports 422, 424 may include 384 separate signals, lines, bits, pins, or other interface connections. As described further below, the ECC engine 122 may write output data from an ECC operation onto one or more of the data out ports 422, 424. For example, the ECC engine 122 may write the x, y coordinates of a point C to the data out ports 422, 424, respectively. The ECC engine 122 further includes a data out valid signal 430. The ECC engine 122 may set the data out valid signal 430 to indicate that valid data is on the data out ports 422, 424.

The ECC engine 122 includes an ECC busy signal 426 and an ECC done signal 428. The ECC engine 122 may set the ECC busy signal 426 to indicate that it is currently processing a cryptographic operation and the processor 120 should not start a new cryptographic operation. The ECC engine 122 may assert a pulse on the ECC done signal 428 to indicate that the cryptographic operation is completed. As described further below, the processor 120 may read results data from the data out ports 422, 424 after the ECC done signal 428 is asserted. The ECC engine 122 further includes a clock signal 432 and an asynchronous reset signal 434.

As shown, the ECC engine 122 includes a datapath selector signal 436. As describe further below, the processor 120 may set the datapath selector signal 436 to program the ECC engine 122 to perform 384-bit cryptographic operations on 384-bit data or clear the datapath selector signal 436 to program the ECC engine 122 to perform 256-bit cryptographic operations on 256-bit data.

The ECC engine 122 further includes an ECC start signal 438, an instruction valid signal 440, and an instruction port 442. As described further below, the processor 120 may assert a pulse on the ECC start signal 438 to cause the ECC engine 122 to start processing a new cryptographic operation. As described above, the ECC engine 122 may set the ECC busy signal 426 after the ECC start signal 438 is asserted. The processor 120 may write an instruction opcode to the instruction port 442. As described further below, the instruction opcode may identify a register 314 to be loaded with data or a cryptographic operation to be performed. The processor 120 may also assert a pulse on the instruction valid signal 440 when a valid instruction opcode has been written to the instruction port 442. As described further below, in response to assertion of the instruction valid signal 440, the ECC engine 122 may read data into the specified register 314 or perform the specified cryptographic operation.

Figure 5:
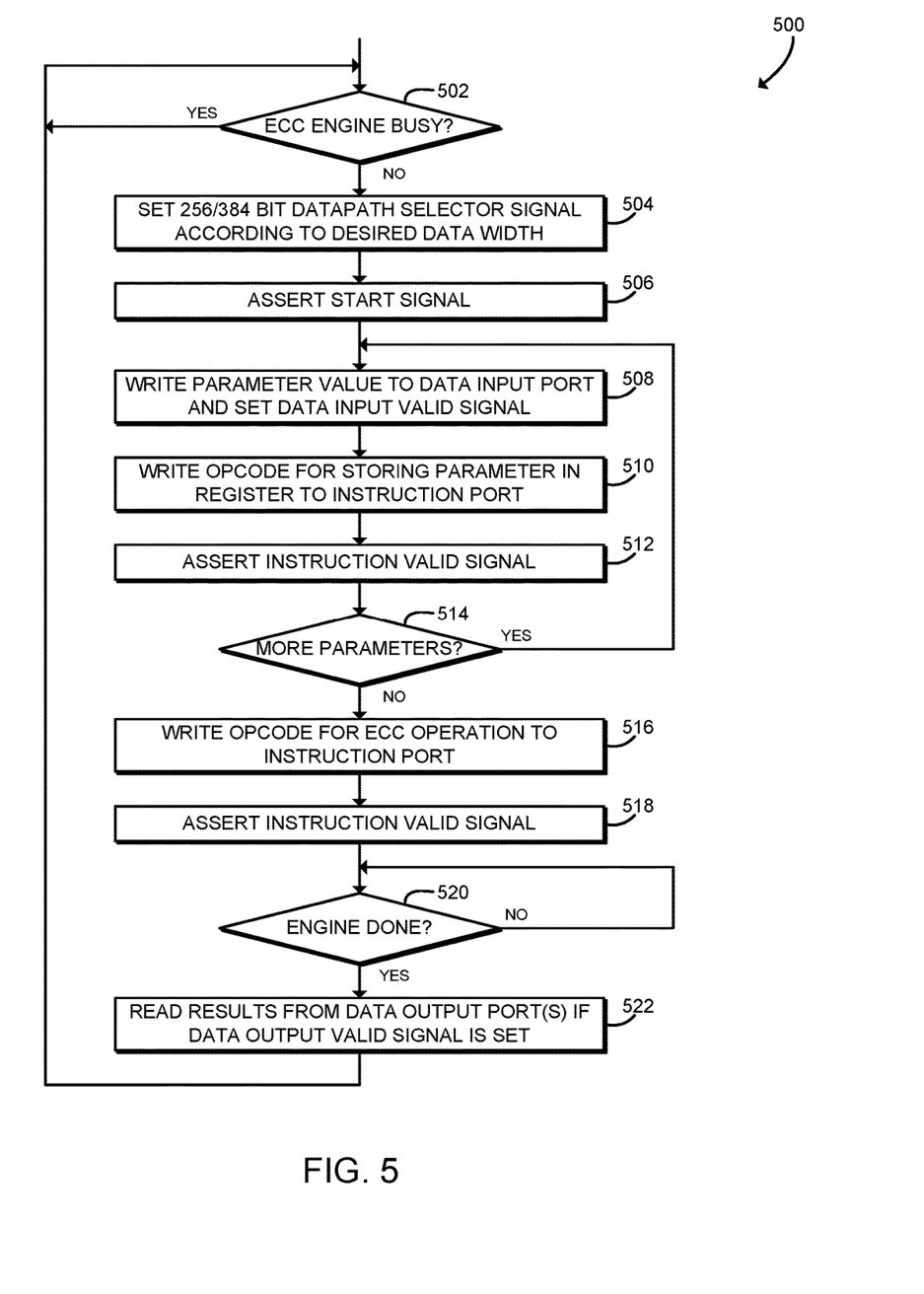
FIG. 5 is a simplified flow diagram of at least one embodiment of a method for driving an ECC engine that may be executed by the computing device of FIGS. 1-4.

Referring now to FIG. 5, in use, the computing device 100 may execute a method 500 for driving the ECC engine 122. It should be appreciated that, in some embodiments, the operations of the method 500 may be performed by one or more components of the environment 200 of the computing device 100 as shown in FIG. 2. For example, the method 500 may be executed by the cryptography driver 204, which may be embodied as software, firmware, and/or microcode executed by the processor 120. The method 500 begins in block 502, in which the computing device 100 determines whether the ECC engine 122 is busy. The computing device 100 may, for example, read the ECC busy signal 426 of the ECC engine 122 and determine whether the ECC busy signal 426 is set. If the ECC engine 122 is busy, the method 500 loops back to block 502 to continue waiting for the ECC engine 122. If the ECC engine 122 is not busy, the method 500 advances to block 504.

In block 504, the computing device 100 sets the 256-bit/384-bit datapath selector signal 436 of the ECC engine 122 according to the desired bit width for the ECC cryptographic operation. For example, the processor 120 may set the datapath selector signal 436 to program the ECC engine 122 to perform 384-bit cryptographic operations on 384-bit data or clear the datapath selector signal 436 to program the ECC engine 122 to perform 256-bit cryptographic operations on 256-bit data. Of course, in some embodiments the sense of the datapath selector signal 436 may be reversed. The bit width of various parameters and results data thus depends on the value of the datapath selector signal 436.

In block 506, the computing device 100 asserts the start signal 438 of the ECC engine 122. For example, the processor 120 may assert a pulse on the start signal 438. As described further below in connection with FIG. 6, the ECC engine 122 beings processing an ECC operation in response to a pulse being asserted on the start signal 438.

In block 508, the computing device 100 writes a parameter value to the data in port 418 of the ECC engine 122. The computing device 100 may write either a 384-bit value to the data in port 418 or a 256-bit value to the least-significant 256 bits of the data in port 418, depending on the value of the datapath selector signal 436. The computing device 100 also sets the data in valid signal 420 to indicate that valid data has been written to the data in port 418. The computing device 100 may write any one of the parameters required for the ECC operation that is to be performed by the ECC engine 122. In particular, the parameter value may correspond to any of the registers 402 to 412 shown in FIG. 4. For example, the parameter may correspond to an x- or y-coordinate of the point A or B, an operand a or b of a prime field operation, a scalar value d, a side-channel attack resistance parameter λ, prime modulus p, or a curve parameter a. Note that in the illustrative embodiment the $r_0z$ register 414 and the $r_1z$ register 416 may not be written by software executed by the processor 120.

In block 510, the computing device 100 writes an opcode to the instruction port 442 of the ECC engine 122 that identifies the register 402 to 412 that is to store the data written to the data in port 418. Each of the opcodes may be embodied as a four-bit binary value that identifies a particular instruction to be performed by the ECC engine 122. Table 1, below, includes one potential embodiment of valid opcodes and their associated instructions. As shown, opcodes 0001 to 0110 identify write instructions that cause the ECC engine 122 to write to the corresponding registers 402 to 412. For example, opcode 0001 is a write instruction to the $r_0x$ register 402, opcode 0010 is a write instruction to the $r_0y$ register 404, and so on. After writing the opcode to the instruction port 442, in block 512 the computing device 100 asserts the instruction valid signal 440 of the ECC engine 122. For example, the processor 120 may assert a pulse on the instruction valid signal 440. As described further below, in response to the instruction valid signal 440 being asserted, the ECC engine 122 may read the parameter data from the data in port 418 and store that data in a register identified by the opcode written to the instruction port 442.

TABLE 1

Valid opcodes and associated instructions for ECC engine commands.

| Opcode | Instruction | Comment |
|---|---|---|
| 0001 | write $r_0x$ | EC operations: x-coordinate of point A<br>$F_p$ operations: first operand a |
| 0010 | write $r_0y$ | EC operations: y coordinate of point A<br>$F_p$ operations: second operand b |
| 0011 | write $d/r_1x$ | [d]A: Scalar value d<br>A + B: x coordinate of point B |
| 0100 | write $\lambda/r_1y$ | [d]A: Side-channel attack resistance parameter $\lambda$<br>A + B: y coordinate of point B |
| 0101 | write p | Prime modulus p |
| 0110 | write a | Curve parameter a |
| 0111 | Reserved | |
| 1000 | [d]A | Elliptic curve scalar multiplication operation |
| 1001 | A + B | Elliptic curve point addition operation (A, B ≠ 0, A ≠ −B) |
| 1010 | 2A | Elliptic curve point doubling operation (A ≠ 0) |
| 1011 | $a^b$ (mod p) | $F_p$ exponentiation operation (note, $a^{-1} = a^{p-1}$ (mod p)) |
| 1100 | a · b (mod p) | $F_p$ multiplication operation |
| 1101 | a + b (mod p) | $F_p$ addition operation |
| 1110 | a − b (mod p) | $F_p$ subtraction operation |
| 1111 | Reserved | |

In block 514, the computing device 100 determines whether additional parameters should be loaded into the ECC engine 122 for the ECC operation that is to be performed. If additional parameters remain, the method 500 loops back to block 508 to load the remaining parameters. If no additional parameters remain, the method 500 advances to block 516.

In block 516, the computing device 100 writes the opcode for the ECC operation that is to be performed to the instruction port 442 of the ECC engine 122. Table 1, above, includes one potential embodiment of valid opcodes and their associated instructions. In particular, the computing device 100 may write an opcode for an elliptic curve operation such as the opcode 1000 for elliptic curve scalar multiplication, the opcode 1001 for elliptic curve point addition, or the opcode 1010 for elliptic curve point doubling. Alternatively, the computing device 100 may write an opcode for a prime field arithmetic operation such as the opcode 1011 for prime field exponentiation, the opcode 1100 for prime field multiplication, the opcode 1101 for prime field addition, or the opcode 1110 for prime field subtraction. In block 518, the computing device 100 asserts the instruction valid signal 440 of the ECC engine 122. For example, the processor 120 may assert a pulse on the instruction valid signal 440. A described further below, in response to the instruction valid signal 440 being asserted, the ECC engine 122 performs the ECC operation specified by the opcode written to the instruction port 442. The ECC engine 122 may perform a 384-bit operation or a 256-bit operation based on the datapath selector signal 436.

In block 520, the computing device 100 determines whether the ECC engine 122 is done processing the ECC operation. For example, the processor 120 may wait for a pulse to be asserted by the ECC engine 122 on the ECC done signal 428. If the ECC engine 122 is not done processing the ECC operation, the method 500 loops back to block 520 to continue waiting for the ECC engine 122. If the ECC operation is done, the method 500 advances to block 522.

In block 522, the computing device 100 reads results data from one or more of the data out ports 422, 424 of the ECC engine 122. The computing device 100 may only read the results data if the data out valid signal 430 of the ECC engine 122 is set. The particular data read by the computing device 100 may depend on the ECC operation performed. For example, for elliptic curve operations, the computing device 100 may read the x coordinate of a result point from the data out port 422 and the y coordinate of the result point from the data out port 424. As another example, for a prime field operation, the computing device 100 may read a result value from the data out port 422. The computing device 100 may read 384-bit result data or 256-bit result data depending on the value of the datapath selector signal 436. After reading the result data, the method 500 loops back to block 502 to perform another ECC operation.

Figure 6:
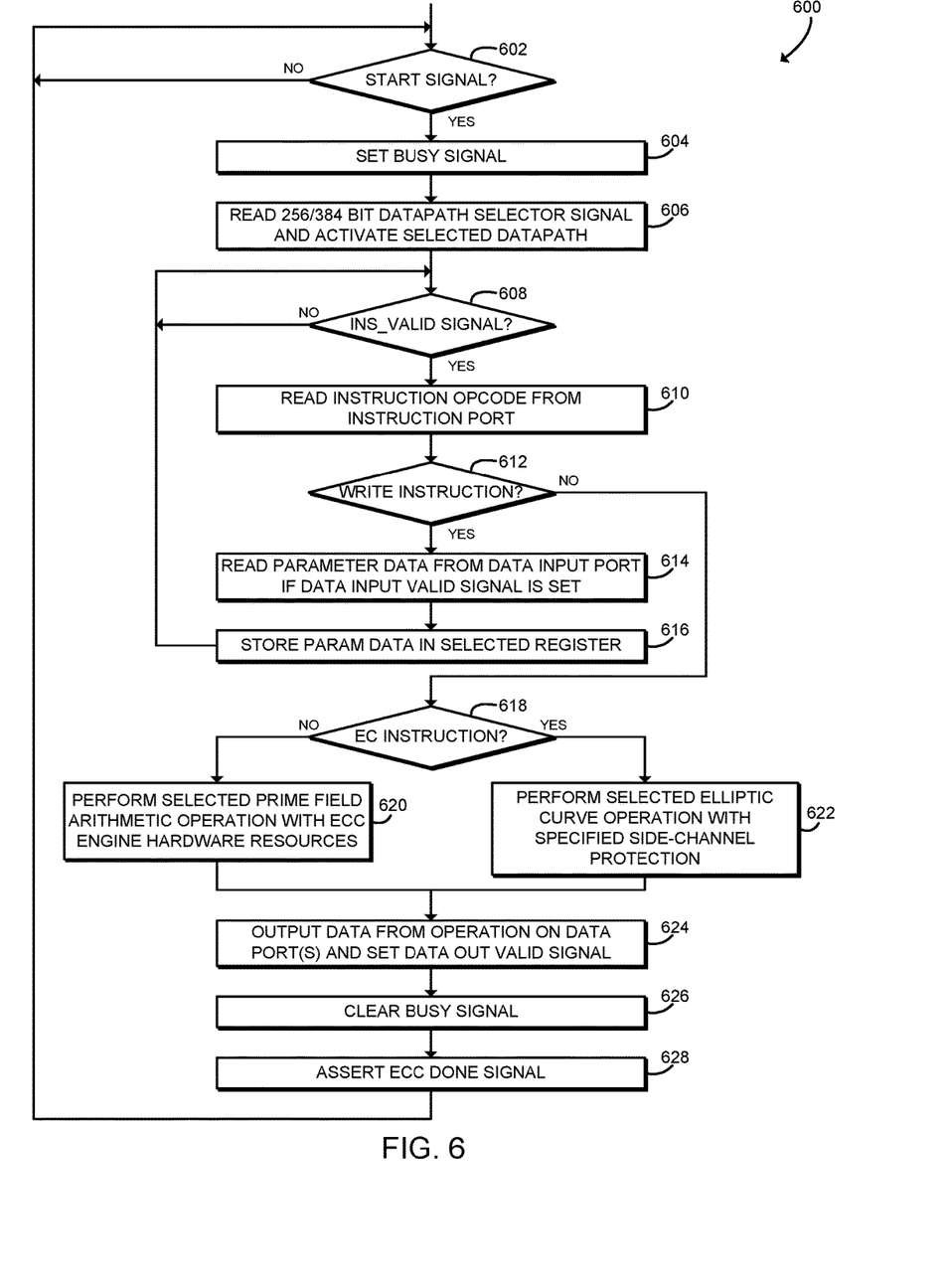
FIG. 6 is a simplified flow diagram of at least one embodiment of a method for ECC hardware acceleration that may be executed by the computing device of FIGS. 1-4.

Referring now to FIG. 6, in use, the computing device 100 may execute a method 600 for ECC hardware acceleration. It should be appreciated that, in some embodiments, the operations of the method 600 may be performed by one or more components of the environment 200 of the computing device 100 as shown in FIG. 2, such as the ECC engine 122. The method 600 begins in block 602, in which the ECC engine 122 monitors for a pulse asserted on the start signal 438 of the ECC engine 122. As described above, software and/or firmware executed by the processor 120 may assert a pulse on the start signal 438 to start processing an ECC operation. If no pulse is detected, the method 600 loops back to block 602 to continue monitoring the start signal 438. If a pulse is detected, the method 600 advances to block 604.

In block 604, the ECC engine 122 sets the busy signal 426. The busy signal 426 indicates that the ECC engine 122 is currently processing an ECC operation. As described above, software and/or firmware executed by the computing device 100 may wait until the busy signal 426 is cleared before starting another ECC operation.

In block 606, the ECC engine 122 reads the 256-bit/384-bit datapath selector signal 436 and actives the selected datapath. As described above, the processor 120 may set the datapath selector signal 436 to program the ECC engine 122 to perform 384-bit cryptographic operations on 384-bit data or clear the datapath selector signal 436 to program the ECC engine 122 to perform 256-bit cryptographic operations on 256-bit data.

In block 608, the ECC engine 122 monitors for a pulse asserted on the instruction valid signal 440. As described above, software and/or firmware executed by the processor 120 may assert a pulse on the instruction valid signal 440 after an instruction to write data into a register or to perform an ECC operation has been written to the instruction port 442. If no pulse is detected, the method 600 loops back to block 608 to continue monitoring the instruction valid signal 440. If a pulse is detected, the method 600 advances to block 610.

In block 610, the ECC engine 122 reads an instruction opcode from the instruction port 442. As described above, the opcode is illustratively embodied as a four-bit value that identifies an instruction to be performed by the ECC engine 122. Valid opcodes are described above in Table 1. In block 612, the ECC engine 122 determines whether the opcode identifies a write instruction corresponding to a register 314. For example, in the illustrative embodiment the ECC engine 122 may determine whether the opcode is between 0001 and 0110, inclusive. If the opcode does not identify a write instruction, the method 600 branches ahead to block 618, described below. If the opcode identifies a write instruction, the method 600 advances to block 614.

In block 614, the ECC engine 122 reads parameter data from the data in port 418. The ECC engine 122 may only read the parameter data if the data in valid signal 420 is set. Additionally or alternatively, in some embodiments the ECC engine 122 may read the parameter data in response to a pulse asserted on the data in valid signal 420. The ECC engine 122 may read 384 bits of data or 256 bits of data from the data in port 418, depending on the value of the datapath selector signal 436. In block 616, the ECC engine 122 stores the data read from the data in port 418 into the register 314 specified by the write instruction. For example, for the opcode 0001, the ECC engine 122 stores the data into the $r_0x$ register 402, for the opcode 0010, the ECC engine 122 stores the data into the $r_0y$ register 404, and so on. After storing the data, the method 600 loops back to block 608 to continue monitoring the instruction valid signal 440. As described above in connection with FIG. 5, the software and/or firmware executed by the processor 120 may perform additional write instructions to write parameter data into each of the registers 314 used by the particular ECC operation to be performed.

Referring back to block 612, if the instruction opcode does not identify a write instruction, the method 600 branches ahead to block 618, in which the ECC engine 122 determines whether the instruction opcode identifies an elliptic curve instruction. As shown in Table 1, above, opcodes for elliptic curve operations include the opcode 1000 for elliptic curve scalar multiplication, the opcode 1001 for elliptic curve point addition, and the opcode 1010 for elliptic curve point doubling. As shown in Table 1, if the instruction opcode does not identify a write instruction or an elliptic curve instruction, then the instruction opcode identifies a prime field arithmetic instruction, such as the opcode 1011 for prime field exponentiation, the opcode 1100 for prime field multiplication, the opcode 1101 for prime field addition, and the opcode 1110 for prime field subtraction. Note that the behavior of the ECC engine 122 for reserved or undefined opcodes is not shown in FIG. 6.

If the instruction opcode does not identify an elliptic curve instruction (i.e., the instruction opcode identifies a prime field arithmetic instruction), then the method 600 branches to block 620. In block 620, the ECC engine 122 performs the specified prime field arithmetic operation using the execution resources 304 of the ECC engine 122. For example, the execution controller 302 may assert various internal control signals to cause the p-exponentiation unit 310 and/or the p-MAS unit 312 to perform the prime field arithmetic operation specified by the instruction opcode. The execution resources 304 may store intermediate data and/or results data into one or more of the registers 314. After performing the prime field instruction, the method 600 advances to block 624, described below.

Referring back to block 618, if the instruction opcode identifies an elliptic curve instruction, the method 600 branches to block 622 in which the ECC engine 122 performs the specified elliptic curve operation using execution resources 304 of the ECC engine 122. The ECC engine 122 may perform the elliptic curve operation using a level of side-channel attack protection that is specified by the parameter $\lambda$, stored in the $\lambda/r_1y$ register 408. For example, if the $\lambda/r_1y$ register 408 is equal to zero, the ECC engine 122 may perform the operation with no side-channel attack protection, which may provide improved performance and may be appropriate for functions that do not involve a private key (e.g., the ECDSA Verify function). Continuing that example, if the $\lambda/r_1y$ register 408 is equal to one, the ECC engine 122 may perform the operation with simple side-channel protection, and if the $\lambda/r_1y$ register 408 is a random value greater than one, the ECC engine 122 may perform the operation with differential side-channel protection. One potential embodiment of a method for performing the elliptic curve instruction with configurable side-channel protection is described below in connection with FIG. 7. After performing the elliptic curve instruction, the method 700 advances to block 624.

In block 624, the ECC engine 122 outputs data on to one or more of the data out ports 422, 424 and sets the data out valid signal 430. For example, the ECC engine 122 may copy data from one or more of the registers 314 to the data out ports 422, 424. The particular data output depends on the instruction that was performed by the ECC engine 122. For example, for elliptic curve instructions (e.g., the opcodes 1000, 1001, and 1010) the ECC engine 122 may output the x coordinate of a result point to the data out port 422 and they coordinate of the result point to the data out port 424. For prime field instructions (e.g., the opcodes 1011, 1100, 1101, and 1110) the ECC engine 122 may output a value to the data out port 422. The ECC engine 122 may output 384-bit data or 256-bit data depending on the datapath selector signal 436.

In block 626, the ECC engine 122 clears the busy signal 426. Clearing the busy signal indicates that the ECC engine 122 is ready to process another ECC operation. In block 628, the ECC engine 122 asserts a pulse on the ECC done signal 428. As described above, after the ECC done signal 428 is asserted, software and/or firmware executed by the processor 120 may read the results from the data out ports 422, 424. After asserting the ECC done signal 428, the method 600 loops back to block 602 to monitor for additional ECC operations.

Figure 7:
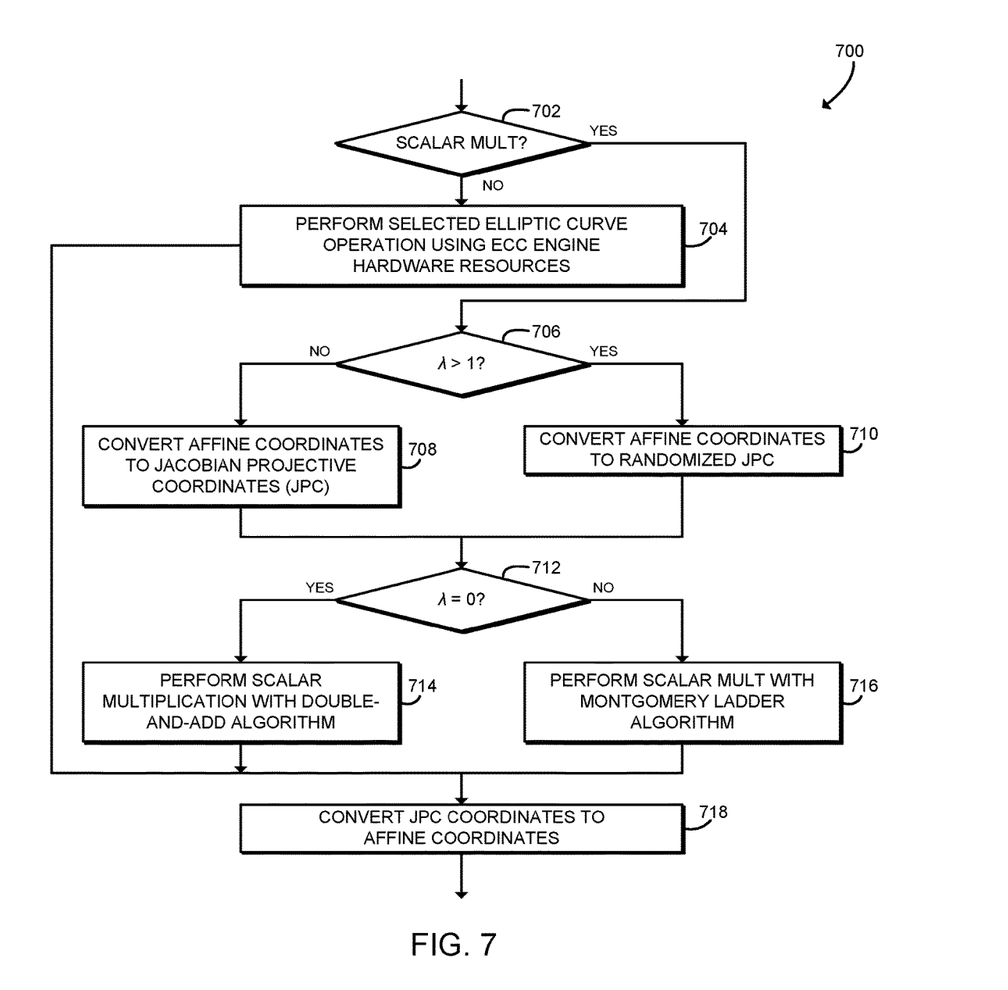
FIG. 7 is a simplified flow diagram of at least one embodiment of a method for performing an ECC operation that may be executed by the computing device of FIGS. 1-4.

Referring now to FIG. 7, in use, the computing device 100 may execute a method 700 for performing an ECC instruction with configurable side-channel protection. It should be appreciated that, in some embodiments, the operations of the method 700 may be performed by one or more components of the environment 200 of the computing device 100 as shown in FIG. 2, such as the ECC engine 122. In particular, the method 700 may be performed in connection with the block 622 of FIG. 6, described above. The method 700 begins in block 702, in which the ECC engine 122 determines whether the specified ECC instruction is elliptic curve scalar multiplication [d]A, indicated by the opcode 1000. If so, the method 700 branches ahead to block 706, described below. If the specified ECC instruction is not scalar multiplication, then the method 700 advances to block 704. In block 704, the ECC engine 122 performs the selected ECC operation using execution resources of the ECC engine 122.

For example, the execution controller 302 may assert various internal control signals to cause the point addition/doubling unit 308 and/or the p-MAS unit 312 to perform the elliptic curve operation specified by the instruction opcode (e.g., elliptic curve point addition A+B for the opcode 1001 or elliptic curve point doubling 2A for the opcode 1010). The execution resources 304 may store intermediate data and/or results data into one or more of the registers 314. After performing the elliptic curve operation, the method 700 advances to block 718, described below.

Referring back to block 702, if the ECC instruction is scalar multiplication, the method 700 branches to block 706, in which the ECC engine 122 determines whether the parameter λ, stored in the $λ/r_1y$ register 408, is greater than one. For example, the parameter λ may be a random number greater than one supplied by software and/or firmware of the processor 120.

If the parameter λ is not greater than one (i.e., if λ is zero or one), then the method 700 branches to block 708, in which the ECC engine 122 converts affine coordinates to Jacobian projective coordinates. Affine coordinates may describe the points A and/or B using x and y values that correspond to the elliptic curve equation. Converting the affine coordinates to Jacobian protective coordinates projects those points into a different, but equivalent coordinate system. The ECC engine 122 may read the affine coordinates from the registers 314 and then store the Jacobian projective coordinates back into the registers 314. For example, affine coordinates for the point A may be stored in the $r_0x$ register 402 and the $r_0y$ register 404 and for the point B may be stored in the $d/r_1x$ register 406 and the $λr_1y$ register 408. Jacobian projective coordinates for the point A may be stored in the $r_0x$ register 402, the $r_0y$ register 404, and the $r_0z$ register 414 and for the point B may be stored in the $d/r_1x$ register 406, the $λ/r_1y$ register 408, and the $r_1z$ register 416. After generating the Jacobian projective coordinates, the method 700 advances to block 712, described below.

Referring back to block 706, if the parameter λ is greater than one, the method 700 branches to block 710, in which the ECC engine 122 converts the Jacobian projection coordinates to randomized Jacobian projection coordinates. The ECC engine 122 may perform a transformation on the coordinates using a random number (e.g., λ) to create equivalent coordinates that may be used for the elliptic curve operation. Due to the properties of Jacobian projection coordinates, those random Jacobian projection coordinates may be used for the operation and will provide the same results as non-randomized Jacobian projection coordinates. By performing the elliptic curve operation on randomized data, the ECC engine 122 may provide protection against differential side-channel attacks. After generating the randomized Jacobian projective coordinates, the method 700 advances to block 712.

In block 712, the ECC engine 122 determines whether the parameter λ equals zero. If so, the method 700 branches to block 714, in which the ECC engine 122 performs the scalar multiplication operation with no side-channel attack protection. In particular, the ECC engine 122 may perform the scalar multiplication operation using a double-and-add operation. For example, the execution controller 302 may assert various internal control signals to cause the point multiplication unit 306, the point addition/doubling unit 308, the p-exponentiation unit 310, and/or the p-MAS unit 312 to perform the scalar multiplication operation. The amount of computational work performed by the ECC engine 122 to perform the double-and-add operation may vary depending on the input data and thus for λ equal to zero the ECC engine 122 may provide no side-channel attack protection. However, performance of the ECC engine 122 without side-channel protection may be about 1½ times faster than performance of the ECC engine 122 with side-channel protection. Thus, execution with no side-channel protection may be appropriate for operations that do not involve secret keys (e.g., the ECDSA Verify function). After performing the scalar multiplication operation, the method 700 advances to block 718, described below.

Referring back to block 712, if the parameter λ does not equal zero, then the method 700 branches to block 716, in which the ECC engine 122 performs the scalar multiplication operation with side-channel protection. In particular, the ECC engine 122 may perform the scalar multiplication operation using a Montgomery Ladder algorithm. For example, the execution controller 302 may assert various internal control signals to cause the point multiplication unit 306, the point addition/doubling unit 308, the p-exponentiation unit 310, and/or the p-MAS unit 312 to perform the scalar multiplication operation. The Montgomery Ladder algorithm performs the same processing for each bit of a secret value and thus timing, power consumption, electromagnetic radiation emitted, and/or other side-channel data for processing each bit of the secret may be uniform. If the parameter λ is one, then the ECC engine 122 performs the Montgomery Ladder algorithm on the Jacobian protection coordinates and thus may provide simple side-channel attack protection. If the parameter λ is greater than one, then the ECC engine 122 performs the Montgomery Ladder algorithm on the randomized Jacobian projection coordinates and thus may provide differential side-channel attack protection. After performing the scalar multiplication operation, the method 700 advances to block 718.

In block 718, the ECC engine 122 converts the Jacobian projection coordinates to affine coordinates. The ECC engine 122 may read the Jacobian projection coordinates from the registers 314 and then store the affine coordinates back into the registers 314. After generating the affine coordinates, the method 700 is completed. The affine coordinates generated by the ECC engine 122 may be used as output data for the ECC instruction. As described above, after completing the elliptic curve instruction, the ECC engine 122 may assert the ECC done signal 428 and the software/firmware executed by the processor 120 may read output data from the data out ports 422, 424.

It should be appreciated that, in some embodiments, the methods 500, 600, and/or 700, may be embodied as various instructions stored on a computer-readable media, which may be executed by the processor 120, the ECC engine 122, the I/O subsystem 124, and/or other components of a computing device 100 to cause the computing device 100 to perform the respective method 500, 600, and/or 700. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for cryptographic acceleration, the computing device comprising an elliptic curve cryptography (ECC) engine to: read a datapath selector signal of the ECC engine, wherein the datapath selector signal indicates a 256-bit data width or a 384-bit data width; read a parameter value for a parameter of a cryptographic operation from a data port of the ECC engine, wherein the parameter value has a data width indicated by the datapath selector signal; read a first opcode from an instruction port of the ECC engine in response to reading of the parameter value, wherein the first opcode is indicative of the cryptographic operation; perform the cryptographic operation with the parameter value in response to reading of the first opcode, wherein the cryptographic operation has a data width indicated by the datapath selector signal; and write results data to an output port of the ECC engine in response to performance of the cryptographic operation, wherein the results data has a data width indicated by the datapath selector signal.

Example 2 includes the subject matter of Example 1, and wherein the cryptographic operation comprises a prime field arithmetic operation.

Example 3 includes the subject matter of any of Examples 1 and 2, and wherein the prime field arithmetic operation comprises a prime field exponentiation operation, a prime field multiplication operation, a prime field addition operation, or a prime field subtraction operation.

Example 4 includes the subject matter of any of Examples 1-3, and wherein the cryptographic operation comprises an elliptic curve operation.

Example 5 includes the subject matter of any of Examples 1-4, and wherein the elliptic curve operation comprises an elliptic curve scalar multiplication operation, an elliptic curve point addition operation, or an elliptic curve subtraction operation.

Example 6 includes the subject matter of any of Examples 1-5, and wherein to perform the elliptic curve operation comprises to perform the elliptic curve operation with a specified side-channel protection level, wherein the parameter value is indicative of the specified side-channel protection level.

Example 7 includes the subject matter of any of Examples 1-6, and wherein the specified side-channel protection level comprises no protection, simple protection, or differential protection.

Example 8 includes the subject matter of any of Examples 1-7, and wherein to perform the elliptic curve operation comprises to: convert one or more affine coordinates to corresponding Jacobian projective coordinates, wherein the affine coordinates and the Jacobian projective coordinates are stored in one or more corresponding registers of the ECC engine; perform the elliptic curve operation with the Jacobian projective coordinates; and convert the Jacobian projective coordinates to corresponding affine coordinates in response to performance of the elliptic curve operation.

Example 9 includes the subject matter of any of Examples 1-8, and wherein: the elliptic curve operation comprises elliptic curve scalar multiplication; the specified side-channel protection level comprises no protection; and to perform the elliptic curve operation further comprises to perform a double-and-add scalar multiplication algorithm.

Example 10 includes the subject matter of any of Examples 1-9, and wherein: the elliptic curve operation comprises elliptic curve scalar multiplication; the specified side-channel protection level comprises simple protection; and to perform the elliptic curve operation further comprises to perform a Montgomery Ladder scalar multiplication algorithm.

Example 11 includes the subject matter of any of Examples 1-10, and wherein: the elliptic curve operation comprises elliptic curve scalar multiplication; the specified side-channel protection level comprises differential protection; to convert the one or more affine coordinates to the corresponding Jacobian projective coordinates comprises to convert the one or more affine coordinates to corresponding randomized Jacobian projective coordinates; and to perform the elliptic curve operation further comprises to perform a Montgomery Ladder scalar multiplication algorithm with the randomized Jacobian projective coordinates.

Example 12 includes the subject matter of any of Examples 1-11, and wherein the ECC engine is further to: determine whether a start signal of the ECC engine is asserted; set a busy signal of the ECC engine in response to a determination that the start signal is asserted; clear the busy signal in response to the performance of the cryptographic operation; and assert an operation done signal of the ECC engine in response to clearing of the busy signal; wherein to read the datapath selector signal comprises to read the datapath selector signal in response to setting of the busy signal.

Example 13 includes the subject matter of any of Examples 1-12, and further comprising a cryptography driver to: determine whether the busy signal of the ECC engine is set; set the datapath selector signal of the ECC engine in response to a determination that the busy signal is not set; assert the start signal of the ECC engine in response to setting of the datapath selector signal; determine whether the operation done signal of the ECC engine is asserted in response to assertion of the start signal; and read results data from the output port of the ECC engine in response to a determination that the operation done signal of the ECC engine is asserted.

Example 14 includes the subject matter of any of Examples 1-13, and wherein the ECC engine is further to: determine whether an instruction valid signal of the ECC engine is asserted in response to the determination that the start signal is asserted; wherein to read the first opcode comprises to read the first opcode in response to a determination that the instruction valid signal of the ECC engine is asserted.

Example 15 includes the subject matter of any of Examples 1-14, and further comprising a cryptography driver to: write the first opcode to the instruction port of the ECC engine in response to assertion of the start signal of the ECC engine; and assert the instruction valid signal of the ECC engine in response to writing of the first opcode.

Example 16 includes the subject matter of any of Examples 1-15, and wherein the ECC engine is further to: read a second opcode from the instruction port of the ECC engine in response to the determination that the start signal is asserted, wherein the second opcode is indicative of the parameter of the cryptographic operation; and store the parameter value in a register of the ECC engine, wherein the register is identified by the second opcode; wherein to read the parameter value comprises to read the parameter value in response to reading of the second opcode.

Example 17 includes the subject matter of any of Examples 1-16, and further comprising a cryptography driver to: write the parameter value to the data port of the ECC engine in response to assertion of the start signal; write the second opcode to the instruction port of the ECC engine in response to writing of the parameter value; and assert an instruction valid signal of the ECC engine in response to writing of the second opcode.

Example 18 includes a method for cryptographic acceleration, the method comprising: reading, by an elliptic curve cryptography (ECC) engine of a computing device, a datapath selector signal of the ECC engine, wherein the datapath selector signal indicates a 256-bit data width or a 384-bit data width; reading, by the ECC engine, a parameter value for a parameter of a cryptographic operation from a data port of the ECC engine, wherein the parameter value has a data width indicated by the datapath selector signal; reading, by the ECC engine, a first opcode from an instruction port of the ECC engine in response to reading the parameter value, wherein the first opcode is indicative of the cryptographic operation; performing, by the ECC engine, the cryptographic operation with the parameter value in response to reading the first opcode, wherein the cryptographic operation has a data width indicated by the datapath selector signal; and writing, by the ECC engine, results data to an output port of the ECC engine in response to performing the cryptographic operation, wherein the results data has a data width indicated by the datapath selector signal.

Example 19 includes the subject matter of Example 18, and wherein performing the cryptographic operation comprises performing a prime field arithmetic operation.

Example 20 includes the subject matter of any of Examples 18 and 19, and wherein performing the prime field arithmetic operation comprises performing a prime field exponentiation operation, a prime field multiplication operation, a prime field addition operation, or a prime field subtraction operation.

Example 21 includes the subject matter of any of Examples 18-20, and wherein performing the cryptographic operation comprises performing an elliptic curve operation.

Example 22 includes the subject matter of any of Examples 18-21, and wherein performing the elliptic curve operation comprises performing an elliptic curve scalar multiplication operation, an elliptic curve point addition operation, or an elliptic curve subtraction operation.

Example 23 includes the subject matter of any of Examples 18-22, and wherein performing the elliptic curve operation comprises performing the elliptic curve operation with a specified side-channel protection level, wherein the parameter value is indicative of the specified side-channel protection level.

Example 24 includes the subject matter of any of Examples 18-23, and wherein the specified side-channel protection level comprises no protection, simple protection, or differential protection.

Example 25 includes the subject matter of any of Examples 18-24, and wherein performing the elliptic curve operation comprises: converting one or more affine coordinates to corresponding Jacobian projective coordinates, wherein the affine coordinates and the Jacobian projective coordinates are stored in one or more corresponding registers of the ECC engine; performing the elliptic curve operation using the Jacobian projective coordinates; and converting the Jacobian projective coordinates to corresponding affine coordinates in response to performing the elliptic curve operation.

Example 26 includes the subject matter of any of Examples 18-25, and wherein: the elliptic curve operation comprises elliptic curve scalar multiplication; the specified side-channel protection level comprises no protection; and performing the elliptic curve operation further comprises performing a double-and-add scalar multiplication algorithm.

Example 27 includes the subject matter of any of Examples 18-26, and wherein: the elliptic curve operation comprises elliptic curve scalar multiplication; the specified side-channel protection level comprises simple protection; and performing the elliptic curve operation further comprises performing a Montgomery Ladder scalar multiplication algorithm.

Example 28 includes the subject matter of any of Examples 18-27, and wherein: the elliptic curve operation comprises elliptic curve scalar multiplication; the specified side-channel protection level comprises differential protection; converting the one or more affine coordinates to the corresponding Jacobian projective coordinates comprises converting the one or more affine coordinates to corresponding randomized Jacobian projective coordinates; performing the elliptic curve operation further comprises performing a Montgomery Ladder scalar multiplication algorithm using the randomized Jacobian projective coordinates.

Example 29 includes the subject matter of any of Examples 18-28, and further comprising: determining, by the ECC engine, whether a start signal of the ECC engine is asserted; setting, by the ECC engine, a busy signal of the ECC engine in response to determining that the start signal is asserted; clearing, by the ECC engine, the busy signal in response to performing the cryptographic operation; and asserting, by the ECC engine, an operation done signal of the ECC engine in response to clearing the busy signal; wherein reading the datapath selector signal comprises reading the datapath selector signal in response to setting the busy signal.

Example 30 includes the subject matter of any of Examples 18-29, and further comprising: determining, by the computing device, whether the busy signal of the ECC engine is set; setting, by the computing device, the datapath selector signal of the ECC engine in response to determining that the busy signal is not set; asserting, by the computing device, the start signal of the ECC engine in response to setting the datapath selector signal; determining, by the computing device, whether the operation done signal of the ECC engine is asserted in response to asserting the start signal; and reading, by the computing device, results data from the output port of the ECC engine in response to determining that the operation done signal of the ECC engine is asserted.

Example 31 includes the subject matter of any of Examples 18-30, and further comprising: determining, by the ECC engine, whether an instruction valid signal of the ECC engine is asserted in response to determining that the start signal is asserted; wherein reading the first opcode comprises reading the first opcode in response to determining that the instruction valid signal of the ECC engine is asserted.

Example 32 includes the subject matter of any of Examples 18-31, and further comprising: writing, by the computing device, the first opcode to the instruction port of the ECC engine in response to asserting the start signal of the ECC engine; and asserting, by the computing device, the instruction valid signal of the ECC engine in response to writing the first opcode.

Example 33 includes the subject matter of any of Examples 18-32, and further comprising: reading, by the ECC engine, a second opcode from the instruction port of the ECC engine in response to determining that the start signal is asserted, wherein the second opcode is indicative of the parameter of the cryptographic operation; and storing, by the ECC engine, the parameter value in a register of the ECC engine, wherein the register is identified by the second opcode; wherein reading the parameter value comprises reading the parameter value in response to reading the second opcode.

Example 34 includes the subject matter of any of Examples 18-33, and further comprising: writing, by the computing device, the parameter value to the data port of the ECC engine in response to asserting the start signal; writing, by the computing device, the second opcode to the instruction port of the ECC engine in response to writing the parameter value; and asserting, by the computing device, an instruction valid signal of the ECC engine in response to writing the second opcode.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for cryptographic acceleration, the computing device comprising: means for reading, by an elliptic curve cryptography (ECC) engine of the computing device, a datapath selector signal of the ECC engine, wherein the datapath selector signal indicates a 256-bit data width or a 384-bit data width; means for reading, by the ECC engine, a parameter value for a parameter of a cryptographic operation from a data port of the ECC engine, wherein the parameter value has a data width indicated by the datapath selector signal; means for reading, by the ECC engine, a first opcode from an instruction port of the ECC engine in response to reading the parameter value, wherein the first opcode is indicative of the cryptographic operation; means for performing, by the ECC engine, the cryptographic operation with the parameter value in response to reading the first opcode, wherein the cryptographic operation has a data width indicated by the datapath selector signal; and means for writing, by the ECC engine, results data to an output port of the ECC engine in response to performing the cryptographic operation, wherein the results data has a data width indicated by the datapath selector signal.

Example 39 includes the subject matter of Example 38, and wherein the means for performing the cryptographic operation comprises means for performing a prime field arithmetic operation.

Example 40 includes the subject matter of any of Examples 38 and 39, and wherein the means for performing the prime field arithmetic operation comprises means for performing a prime field exponentiation operation, means for performing a prime field multiplication operation, means for performing a prime field addition operation, or means for performing a prime field subtraction operation.

Example 41 includes the subject matter of any of Examples 38-40, and wherein the means for performing the cryptographic operation comprises means for performing an elliptic curve operation.

Example 42 includes the subject matter of any of Examples 38-41, and wherein the means for performing the elliptic curve operation comprises means for performing an elliptic curve scalar multiplication operation, means for performing an elliptic curve point addition operation, or means for performing an elliptic curve subtraction operation.

Example 43 includes the subject matter of any of Examples 38-42, and wherein the means for performing the elliptic curve operation comprises means for performing the elliptic curve operation with a specified side-channel protection level, wherein the parameter value is indicative of the specified side-channel protection level.

Example 44 includes the subject matter of any of Examples 38-43, and wherein the specified side-channel protection level comprises no protection, simple protection, or differential protection.

Example 45 includes the subject matter of any of Examples 38-44, and wherein the means for performing the elliptic curve operation comprises: means for converting one or more affine coordinates to corresponding Jacobian projective coordinates, wherein the affine coordinates and the Jacobian projective coordinates are stored in one or more corresponding registers of the ECC engine; means for performing the elliptic curve operation using the Jacobian projective coordinates; and means for converting the Jacobian projective coordinates to corresponding affine coordinates in response to performing the elliptic curve operation.

Example 46 includes the subject matter of any of Examples 38-45, and wherein: the elliptic curve operation comprises elliptic curve scalar multiplication; the specified side-channel protection level comprises no protection; and the means for performing the elliptic curve operation further comprises means for performing a double-and-add scalar multiplication algorithm.

Example 47 includes the subject matter of any of Examples 38-46, and wherein: the elliptic curve operation comprises elliptic curve scalar multiplication; the specified side-channel protection level comprises simple protection; and the means for performing the elliptic curve operation further comprises means for performing a Montgomery Ladder scalar multiplication algorithm.

Example 48 includes the subject matter of any of Examples 38-47, and wherein: the elliptic curve operation comprises elliptic curve scalar multiplication; the specified side-channel protection level comprises differential protection; the means for converting the one or more affine coordinates to the corresponding Jacobian projective coordinates comprises means for converting the one or more affine coordinates to corresponding randomized Jacobian projective coordinates; and the means for performing the elliptic curve operation further comprises means for performing a Montgomery Ladder scalar multiplication algorithm using the randomized Jacobian projective coordinates.

Example 49 includes the subject matter of any of Examples 38-48, and further comprising: means for determining, by the ECC engine, whether a start signal of the ECC engine is asserted; means for setting, by the ECC engine, a busy signal of the ECC engine in response to determining that the start signal is asserted; means for clearing, by the ECC engine, the busy signal in response to performing the cryptographic operation; and means for asserting, by the ECC engine, an operation done signal of the ECC engine in response to clearing the busy signal; wherein the means for reading the datapath selector signal comprises means for reading the datapath selector signal in response to setting the busy signal.

Example 50 includes the subject matter of any of Examples 38-49, and further comprising: means for determining whether the busy signal of the ECC engine is set; means for setting the datapath selector signal of the ECC engine in response to determining that the busy signal is not set; means for asserting the start signal of the ECC engine in response to setting the datapath selector signal; means for determining whether the operation done signal of the ECC engine is asserted in response to asserting the start signal;

and means for reading results data from the output port of the ECC engine in response to determining that the operation done signal of the ECC engine is asserted.

Example 51 includes the subject matter of any of Examples 38-50, and further comprising: means for determining, by the ECC engine, whether an instruction valid signal of the ECC engine is asserted in response to determining that the start signal is asserted; wherein the means for reading the first opcode comprises means for reading the first opcode in response to determining that the instruction valid signal of the ECC engine is asserted.

Example 52 includes the subject matter of any of Examples 38-51, and further comprising: means for writing the first opcode to the instruction port of the ECC engine in response to asserting the start signal of the ECC engine; and means for asserting the instruction valid signal of the ECC engine in response to writing the first opcode.

Example 53 includes the subject matter of any of Examples 38-52, and further comprising: means for reading, by the ECC engine, a second opcode from the instruction port of the ECC engine in response to determining that the start signal is asserted, wherein the second opcode is indicative of the parameter of the cryptographic operation; and means for storing, by the ECC engine, the parameter value in a register of the ECC engine, wherein the register is identified by the second opcode; wherein the means for reading the parameter value comprises means for reading the parameter value in response to reading the second opcode.

Example 54 includes the subject matter of any of Examples 38-53, and further comprising: means for writing the parameter value to the data port of the ECC engine in response to asserting the start signal; means for writing the second opcode to the instruction port of the ECC engine in response to writing the parameter value; and means for asserting an instruction valid signal of the ECC engine in response to writing the second opcode.

The invention claimed is:

1. A computing device for cryptographic acceleration, the computing device comprising an elliptic curve cryptography (ECC) engine to:
   read a datapath selector signal of the ECC engine, wherein the datapath selector signal indicates a 256-bit data width or a 384-bit data width;
   read a parameter value for a parameter of a cryptographic operation from a data port of the ECC engine, wherein the parameter value has a data width indicated by the datapath selector signal;
   read a first opcode from an instruction port of the ECC engine in response to reading of the parameter value, wherein the first opcode is indicative of the cryptographic operation;
   perform the cryptographic operation with the parameter value in response to reading of the first opcode, wherein the cryptographic operation has a data width indicated by the datapath selector signal; and
   write results data to an output port of the ECC engine in response to performance of the cryptographic operation, wherein the results data has a data width indicated by the datapath selector signal.

2. The computing device of claim 1, wherein the cryptographic operation comprises a prime field arithmetic operation.

3. The computing device of claim 1, wherein the cryptographic operation comprises an elliptic curve operation.

4. The computing device of claim 3, wherein to perform the elliptic curve operation comprises to perform the elliptic curve operation with a specified side-channel protection level, wherein the parameter value is indicative of the specified side-channel protection level.

5. The computing device of claim 4, wherein the specified side-channel protection level comprises no protection, simple protection, or differential protection.

6. The computing device of claim 4, wherein to perform the elliptic curve operation comprises to:
   convert one or more affine coordinates to corresponding Jacobian projective coordinates, wherein the affine coordinates and the Jacobian projective coordinates are stored in one or more corresponding registers of the ECC engine;
   perform the elliptic curve operation with the Jacobian projective coordinates; and
   convert the Jacobian projective coordinates to corresponding affine coordinates in response to performance of the elliptic curve operation.

7. The computing device of claim 6, wherein:
   the elliptic curve operation comprises elliptic curve scalar multiplication;
   the specified side-channel protection level comprises no protection; and
   to perform the elliptic curve operation further comprises to perform a double-and-add scalar multiplication algorithm.

8. The computing device of claim 6, wherein:
   the elliptic curve operation comprises elliptic curve scalar multiplication;
   the specified side-channel protection level comprises simple protection; and
   to perform the elliptic curve operation further comprises to perform a Montgomery Ladder scalar multiplication algorithm.

9. The computing device of claim 6, wherein:
   the elliptic curve operation comprises elliptic curve scalar multiplication;
   the specified side-channel protection level comprises differential protection;
   to convert the one or more affine coordinates to the corresponding Jacobian projective coordinates comprises to convert the one or more affine coordinates to corresponding randomized Jacobian projective coordinates; and
   to perform the elliptic curve operation further comprises to perform a Montgomery Ladder scalar multiplication algorithm with the randomized Jacobian projective coordinates.

10. The computing device of claim 1, wherein the ECC engine is further to:
    determine whether a start signal of the ECC engine is asserted;
    set a busy signal of the ECC engine in response to a determination that the start signal is asserted;
    clear the busy signal in response to the performance of the cryptographic operation; and
    assert an operation done signal of the ECC engine in response to clearing of the busy signal;
    wherein to read the datapath selector signal comprises to read the datapath selector signal in response to setting of the busy signal.

11. The computing device of claim 10, further comprising a cryptography driver to:
    determine whether the busy signal of the ECC engine is set;
    set the datapath selector signal of the ECC engine in response to a determination that the busy signal is not set;

assert the start signal of the ECC engine in response to setting of the datapath selector signal;

determine whether the operation done signal of the ECC engine is asserted in response to assertion of the start signal; and read results data from the output port of the ECC engine in response to a determination that the operation done signal of the ECC engine is asserted.

12. The computing device of claim 10, wherein the ECC engine is further to:

determine whether an instruction valid signal of the ECC engine is asserted in response to the determination that the start signal is asserted;

wherein to read the first opcode comprises to read the first opcode in response to a determination that the instruction valid signal of the ECC engine is asserted.

13. The computing device of claim 12, further comprising a cryptography driver to:

write the first opcode to the instruction port of the ECC engine in response to assertion of the start signal of the ECC engine; and assert the instruction valid signal of the ECC engine in response to writing of the first opcode.

14. A method for cryptographic acceleration, the method comprising:

reading, by an elliptic curve cryptography (ECC) engine of a computing device, a datapath selector signal of the ECC engine, wherein the datapath selector signal indicates a 256-bit data width or a 384-bit data width;

reading, by the ECC engine, a parameter value for a parameter of a cryptographic operation from a data port of the ECC engine, wherein the parameter value has a data width indicated by the datapath selector signal;

reading, by the ECC engine, a first opcode from an instruction port of the ECC engine in response to reading the parameter value, wherein the first opcode is indicative of the cryptographic operation;

performing, by the ECC engine, the cryptographic operation with the parameter value in response to reading the first opcode, wherein the cryptographic operation has a data width indicated by the datapath selector signal; and writing, by the ECC engine, results data to an output port of the ECC engine in response to performing the cryptographic operation, wherein the results data has a data width indicated by the datapath selector signal.

15. The method of claim 14, wherein:

performing the cryptographic operation comprises performing an elliptic curve operation; and performing the elliptic curve operation comprises performing the elliptic curve operation with a specified side-channel protection level, wherein the parameter value is indicative of the specified side-channel protection level.

16. The method of claim 15, wherein the specified side-channel protection level comprises no protection, simple protection, or differential protection.

17. The method of claim 15, wherein performing the elliptic curve operation comprises:

converting one or more affine coordinates to corresponding Jacobian projective coordinates, wherein the affine coordinates and the Jacobian projective coordinates are stored in one or more corresponding registers of the ECC engine;

performing the elliptic curve operation using the Jacobian projective coordinates; and converting the Jacobian projective coordinates to corresponding affine coordinates in response to performing the elliptic curve operation.

18. The method of claim 14, further comprising:

determining, by the ECC engine, whether a start signal of the ECC engine is asserted;

setting, by the ECC engine, a busy signal of the ECC engine in response to determining that the start signal is asserted;

clearing, by the ECC engine, the busy signal in response to performing the cryptographic operation; and asserting, by the ECC engine, an operation done signal of the ECC engine in response to clearing the busy signal;

wherein reading the datapath selector signal comprises reading the datapath selector signal in response to setting the busy signal.

19. The method of claim 18, further comprising:

determining, by the computing device, whether the busy signal of the ECC engine is set;

setting, by the computing device, the datapath selector signal of the ECC engine in response to determining that the busy signal is not set;

asserting, by the computing device, the start signal of the ECC engine in response to setting the datapath selector signal;

determining, by the computing device, whether the operation done signal of the ECC engine is asserted in response to asserting the start signal; and reading, by the computing device, results data from the output port of the ECC engine in response to determining that the operation done signal of the ECC engine is asserted.

20. One or more computer-readable storage media comprising a plurality of instructions that in response to being executed cause a computing device to:

read, by an elliptic curve cryptography (ECC) engine of the computing device, a datapath selector signal of the ECC engine, wherein the datapath selector signal indicates a 256-bit data width or a 384-bit data width;

read, by the ECC engine, a parameter value for a parameter of a cryptographic operation from a data port of the ECC engine, wherein the parameter value has a data width indicated by the datapath selector signal;

read, by the ECC engine, a first opcode from an instruction port of the ECC engine in response to reading the parameter value, wherein the first opcode is indicative of the cryptographic operation;

perform, by the ECC engine, the cryptographic operation with the parameter value in response to reading the first opcode, wherein the cryptographic operation has a data width indicated by the datapath selector signal; and write, by the ECC engine, results data to an output port of the ECC engine in response to performing the cryptographic operation, wherein the results data has a data width indicated by the datapath selector signal.

21. The one or more computer-readable storage media of claim 20, wherein:

to perform the cryptographic operation comprises to perform an elliptic curve operation; and to perform the elliptic curve operation comprises to perform the elliptic curve operation with a specified side-channel protection level, wherein the parameter value is indicative of the specified side-channel protection level.

22. The one or more computer-readable storage media of claim 21, wherein the specified side-channel protection level comprises no protection, simple protection, or differential protection.

23. The one or more computer-readable storage media of claim 21, wherein to perform the elliptic curve operation comprises to:
- convert one or more affine coordinates to corresponding Jacobian projective coordinates, wherein the affine coordinates and the Jacobian projective coordinates are stored in one or more corresponding registers of the ECC engine;
- perform the elliptic curve operation using the Jacobian projective coordinates; and
- convert the Jacobian projective coordinates to corresponding affine coordinates in response to performing the elliptic curve operation.

24. The one or more computer-readable storage media of claim 20, further comprising a plurality of instructions that in response to being executed cause the computing device to:
- determine, by the ECC engine, whether a start signal of the ECC engine is asserted;
- set, by the ECC engine, a busy signal of the ECC engine in response to determining that the start signal is asserted;
- clear, by the ECC engine, the busy signal in response to performing the cryptographic operation; and
- assert, by the ECC engine, an operation done signal of the ECC engine in response to clearing the busy signal;
- wherein to read the datapath selector signal comprises to read the datapath selector signal in response to setting the busy signal.

25. The one or more computer-readable storage media of claim 24, further comprising a plurality of instructions that in response to being executed cause the computing device to:
- determine whether the busy signal of the ECC engine is set;
- set the datapath selector signal of the ECC engine in response to determining that the busy signal is not set;
- assert the start signal of the ECC engine in response to setting the datapath selector signal;
- determine whether the operation done signal of the ECC engine is asserted in response to asserting the start signal; and
- read results data from the output port of the ECC engine in response to determining that the operation done signal of the ECC engine is asserted.

* * * * *